(12) United States Patent
Mulla et al.

(10) Patent No.: US 6,539,457 B1
(45) Date of Patent: Mar. 25, 2003

(54) CACHE ADDRESS CONFLICT MECHANISM WITHOUT STORE BUFFERS

(75) Inventors: Dean A. Mulla, Saratoga, CA (US); Reid James Riedlinger, Fort Collins, CO (US); Thomas Grutkowski, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/510,279

(22) Filed: Feb. 21, 2000

(51) Int. Cl.[7] .............................................. G06F 12/00
(52) U.S. Cl. ......................... 711/131; 711/117; 711/119
(58) Field of Search .................................. 711/117, 119, 711/131

(56) References Cited

U.S. PATENT DOCUMENTS

| | | | | |
|---|---|---|---|---|
| 5,261,066 A | * | 11/1993 | Jouppi et al. ................ | 711/122 |
| 5,561,784 A | * | 10/1996 | Chen et al. ................... | 711/157 |
| 5,623,628 A | | 4/1997 | Brayton et al. | |
| 5,640,534 A | * | 6/1997 | Liu et al. ..................... | 711/146 |
| 5,752,260 A | * | 5/1998 | Liu et al. ..................... | 711/129 |
| 5,761,706 A | * | 6/1998 | Kessler et al. ............... | 711/118 |
| 5,781,924 A | * | 7/1998 | Zaitzeva et al. ............. | 711/131 |
| 5,784,630 A | * | 7/1998 | Saito et al. ................... | 709/213 |
| 5,860,095 A | * | 1/1999 | Iacobovici et al. .......... | 711/119 |
| 5,930,819 A | * | 7/1999 | Hetherington et al. ...... | 711/131 |
| 6,081,873 A | * | 6/2000 | Hetherington et al. ...... | 711/131 |
| 6,145,054 A | * | 11/2000 | Mehrotra et al. ............ | 711/119 |
| 6,345,335 B1 | * | 2/2002 | Flynn ........................... | 711/123 |

FOREIGN PATENT DOCUMENTS

WO        WO 98/13763        * 4/1998

* cited by examiner

Primary Examiner—Reba I. Elmore

(57) ABSTRACT

The inventive cache manages address conflicts and maintains program order without using a store buffer. The cache utilizes an issue algorithm to insure that accesses issued in the same clock are actually issued in an order that is consistent with program order. This is enabled by performing address comparisons prior to insertion of the accesses into the queue. Additionally, when accesses are separated by one or more clocks, address comparisons are performed, and accesses that would get data from the cache memory array before a prior update has actually updated the cache memory in the array are canceled. This provides a guarantee that program order is maintained, as an access is not allowed to complete until it is assured that the most recent data will be received upon access of the array.

22 Claims, 5 Drawing Sheets

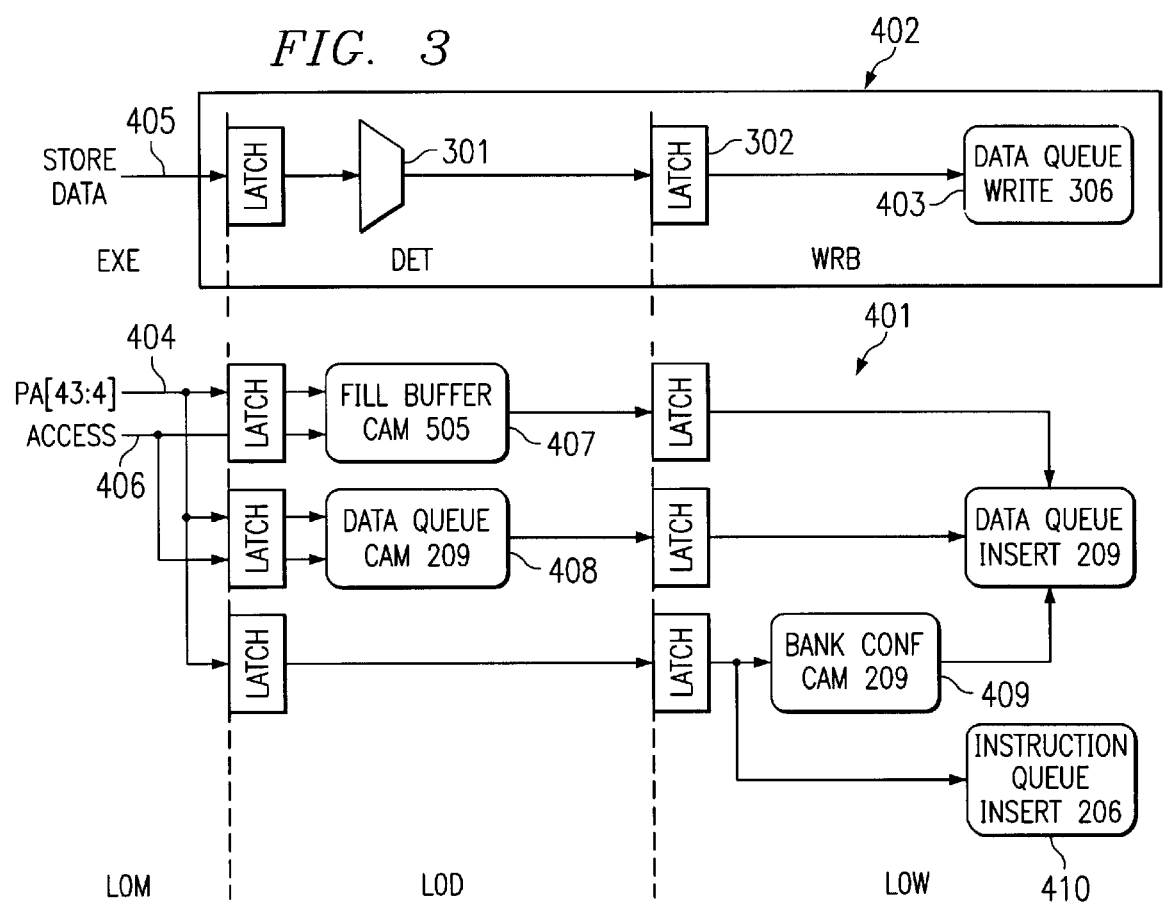
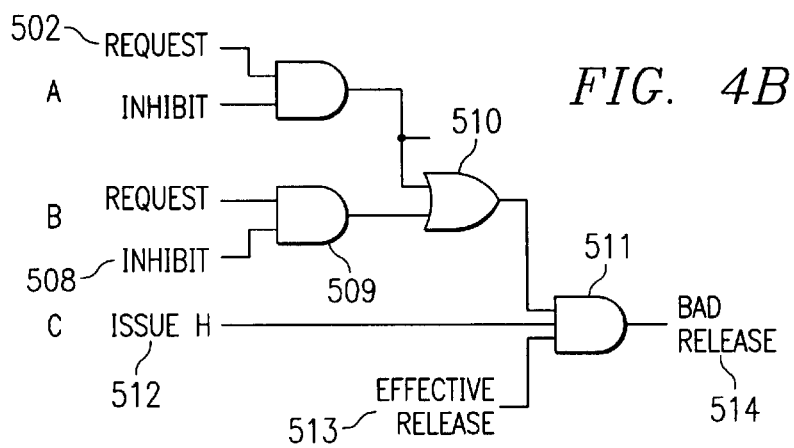

| TIME | L1N | L1I | L1A | L1M | L1D | L1C | L1W ← 515 |
|---|---|---|---|---|---|---|---|
| 1 | STORE1 | | | | | | |
| 2 | LdA | STORE1 | | | | | |
| 3 | LdB | LdA | STORE1 | | | | |
| 4 | LdC | LdB | LdA | STORE1 | | | |
| 5 | LdD | LdC | LdB | LdA | STORE1 | | |
| 6 | STORE2 | LdD | LdC | LdB | | STORE1 | |
| 7 | | STORE2 | LdD | LdC | | | STORE1 |
| 8 | | | STORE2 | LdD | | | |
| 9 | | | | STORE2 | | | |
↑
516
FIG. 5
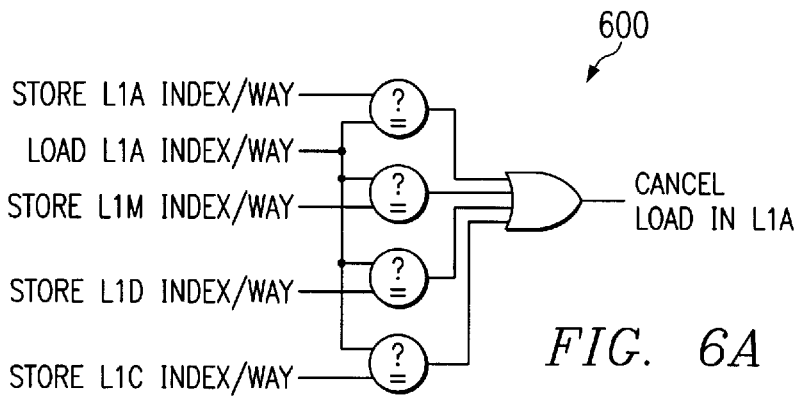
FIG. 6A
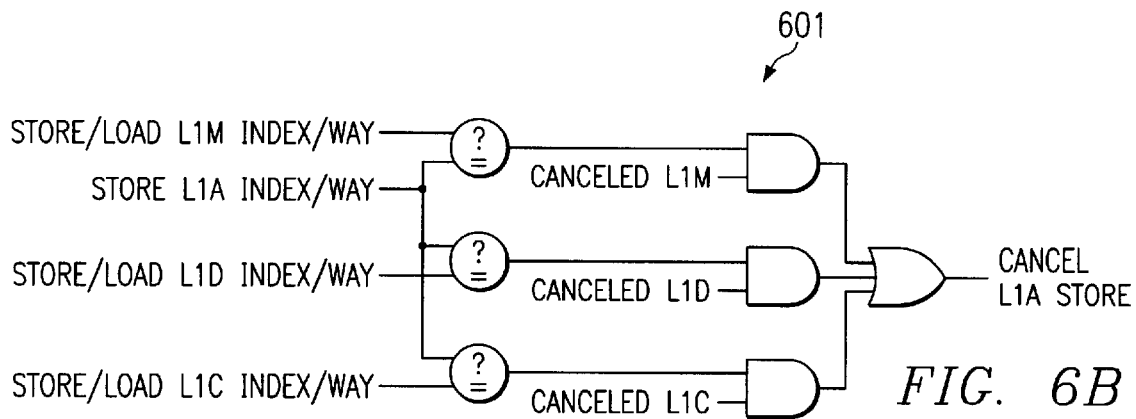
FIG. 6B

CACHE ADDRESS CONFLICT MECHANISM WITHOUT STORE BUFFERS

RELATED APPLICATIONS

This application is related to co-pending and commonly assigned patent application Ser. No. 09/501,396 entitled "METHOD AND SYSTEM FOR EARLY TAG ACCESSES FOR LOWER-LEVEL CACHES IN PARALLEL WITH FIRST-LEVEL CACHE," co-pending and commonly assigned patent application Ser. No. 09/510,283 entitled CACHE CHAIN STRUCTURE TO IMPLEMENT HIGH BANDWIDTH LOW LATENCY CACHE MEMORY SUBSYSTEM," co-pending and commonly assigned U.S. patent application Ser. No. 09/510,973 entitled "MULTIPLE ISSUE ALGORITHM WITH OVERSUBSCRIPTION AVOIDANCE FEATURES TO GET HIGH BANDWIDTH THROUGH CACHE PIPELINE," co-pending and commonly assigned U.S. patent application Ser. No. 09/510,285 entitled "L1 CACHE MEMORY," and co-pending and commonly assigned U.S. patent application Ser. No. 09/507,333 entitled "MULTI-PORTED REGISTER STRUCTURES WITH A PULSE WRITE MECHANISM," the disclosures of which are hereby incorporated herein by reference.

TECHNICAL FIELD

This invention relates in general to computer systems, and in specific to an arrangement for a cache memory system.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly. Caches have been configured in both on chip and off-chip arrangements. On-processor-chip caches have less latency, since they are closer to the processor, but since on-chip area is expensive, such caches are typically smaller than off-chip caches. Off-processor-chip caches have longer latencies since they are remotely located from the processor, but such caches are typically larger than on-chip caches.

A prior art solution has been to have multiple caches, some small and some large. Typically, the smaller caches would be located on-chip, and the larger caches would be located off-chip. Typically, in multi-level cache designs, the first level of cache (i.e., L0) is first accessed to determine whether a true cache hit for a memory access request is achieved. If a true cache hit is not achieved for the first level of cache, then a determination is made for the second level of cache (i.e., L1), and so on, until the memory access request is satisfied by a level of cache. If the requested address is not found in any of the cache levels, the processor then sends a request to the system's main memory in an attempt to satisfy the request. In many processor designs, the time required to access an item for a true cache hit is one of the primary limiters for the clock rate of the processor if the designer is seeking a single-cycle cache access time. In other designs, the cache access time may be multiple cycles, but the performance of a processor can be improved in most cases when the cache access time in cycles is reduced. Therefore, optimization of access time for cache hits is critical for the performance of the computer system.

Prior art cache designs for computer processors typically require "control data" or tags to be available before a cache data access begins. The tags indicates whether a desired address (i.e., an address required for a memory access request) is contained within the cache. Accordingly, prior art caches are typically implemented in a serial fashion, wherein upon the cache receiving a memory access request, a tag is obtained for the request, and thereafter if the tag indicates that the desired address is contained within the cache, the cache's data array is accessed to satisfy the memory access request. Thus, prior art cache designs typically generate tags indicating whether a true cache "hit" has been achieved for a level of cache, and only after a true cache hit has been achieved is the cache data actually accessed to satisfy the memory access request. A true cache "hit" occurs when a processor requests an item from a cache and the item is actually present in the cache. A cache "miss" occurs when a processor requests an item from a cache and the item is not present in the cache. The tag data indicating whether a "true" cache hit has been achieved for a level of cache typically comprises a tag match signal. The tag match signal indicates whether a match was made for a requested address in the tags of a cache level. However, such a tag match signal alone does not indicate whether a true cache hit has been achieved.

As an example, in a multi-processor system, a tag match may be achieved for a cache level, but the particular cache line for which the match was achieved may be invalid. For instance, the particular cache line may be invalid because another processor has snooped out that particular cache line. As used herein a "snoop" is an inquiry from a first processor to a second processor as to whether a particular cache address is found within the second processor. Accordingly, in multi-processor systems a MESI signal is also typically utilized to indicate whether a line in cache is "Modified, Exclusive, Shared, or Invalid." Therefore, the control data that indicates whether a true cache hit has been achieved for a level of cache typically comprises a MESI signal, as well as the tag match signal. Only if a tag match is found for a level of cache and the MESI protocol indicates that such tag match is valid, does the control data indicate that a true cache hit has been achieved. In view of the above, in prior art cache designs, a determination is first made as to whether a tag match is found for a level of cache, and then a determination is made as to whether the MESI protocol indicates that a tag match is valid. Thereafter, if a determination has been made that a true tag hit has been achieved, access begins to the actual cache data requested.

Turning to FIG. 7, an example of a typical cache design of the prior art is shown. Typically, when an instruction requires access to a particular address, a virtual address is provided from the processor to the cache system. As is well-known in the art, such virtual address typically contains an index field and a virtual page number field. The virtual address is input into a translation look-aside buffer ("TLB") 710. TLB 710 is a common component of modern cache architectures that is well known in the art. TLB 710 provides a translation from the received virtual address to a physical address. Within a computer system, the virtual address space is typically much larger than the physical address space. The physical address space is the actual, physical memory address of a computer system, which includes cache, main memory, a hard drive, and anything else that the computer can access to retrieve data. Thus, for a computer system to be capable of accessing all of the physical address space, a complete physical mapping from virtual addresses to physical addresses is typically provided.

Once the received virtual address is translated into a physical address by the TLB 710, the index field of such physical address is input into the cache level's tag(s) 712, which may be duplicated N times for N "ways" of associativity. As used herein, the term "way" refers to a partition of the cache. For example, the cache of a system may be partitioned into any number of ways. Caches are commonly partitioned into four ways. The physical address index is also input to the cache level's data array(s) 716, which may also be duplicated N times for N ways of associativity.

From the cache level's tag(s) 712, a way tag match signal is generated for each way. The way tag match signal indicates whether a match for the physical address was made within the cache level's tag(s) 712. As discussed above, in multi-processor systems, a MESI protocol is typically utilized to indicate whether a line in cache is modified and exclusive, shared, or invalid. Accordingly, in such multi-processor systems the MESI protocol is combined with the way tag match signal to indicate whether a "true" tag hit has been achieved for a level of cache. Thus, in multi-processor systems a true tag hit is achieved when both a tag match is found for tag(s) 712 and the MESI protocol indicates that such tag match is a valid match. Accordingly, in FIG. 7, MESI circuitry 714 is utilized to calculate a "true" tag hit signal to determine whether a true tag hit has been achieved for that level of cache. Once it is determined from the MESI 714 that a "true" tag hit has been achieved for that level of cache, then that cache level's data array(s) 716, which may also be duplicated N times for N ways of associativity, are accessed to satisfy the received memory access request. More specifically, the true tag hit signal may be used to control a multiplexer ("MUX") 718 to select the appropriate data array way to output data to satisfy the received memory access request. The selected data from data array(s) 716 is output to the chip's core 720, which is the particular execution unit (e.g., an integer execution unit or floating point execution unit) that issued the memory access request to the cache.

In view of the above, prior art caches are typically implemented in a serial fashion, with each subsequent cache being connected to a predecessor cache by a single port. Thus, prior art caches have been only able to handle limited numbers of requests at one time. Therefore, the prior art caches have not been able to provide high enough bandwidth back to the CPU core, which means that the designs of the prior art increase latency in retrieving data from cache, which slows the execution unit within the core of a chip.

In prior art systems, program ordering has been maintained by handling address conflicts using store buffers, such that as store operations are processed, and before they are actually updated into the cache memory array, the data resides in a store buffer. Control logic with address comparators are used to determine if a later load or store needs the data from one of those stores that has not been updated into the cache memory array. If there is a detection that the data is needed, then that data is read out and combined with data from the cache memory, and the combination is provided as the load data back to the CPU core. The main problem with this arrangement is the high level of complexity. A store buffer structure with these read points is very complicated. Also, this arrangement requires a large amount of surface area as many components are required for its operations, e.g. comparators, and MUXes, particularly to perform the merging of the buffer data and the cache data.

SUMMARY OF THE INVENTION

These and other objects, features and technical advantages are achieved by a system and method which uses an L1 cache that has multiple ports. The inventive cache uses separate queuing structures for data and instructions, thus allowing out-of-order processing. The inventive cache uses ordering mechanisms that guarantee program order when there are address conflicts and architectural ordering requirements. The queuing structures are snoopable by other processors of a multiprocessor system. This is required because the tags are before the queues in the pipeline. Note that this means the queue contains tag state including hit/miss information. When a snoop is performed on the tags, if it is not also performed on the queue, the queue would believe it has a hit for a line no longer present in the cache. Thus, the queue must be snoopable by other processors in the system.

The inventive cache has a tag access bypass around the queuing structures, to allow for speculative checking by other levels of cache and for lower latency if the queues are empty. The inventive cache allows for at least four accesses to be processed simultaneously. The results of the access can be sent to multiple consumers. The multiported nature of the inventive cache allows for a very high bandwidth to be processed through this cache with a low latency.

The inventive cache manages address conflicts and maintains program order without using a store buffer. The cache utilizes an issue algorithm to insure that accesses issued in the same clock are actually issued in an order that is consistent with program order. This is enabled by performing address comparisons prior to insertion of the accesses into the queue. Additionally, when accesses are separated by one or more clocks, address comparisons are performed, and accesses that would get data from the cache memory array before a prior update has actually updated the cache memory in the array are canceled. This provides a guarantee that program order is maintained, as an access is not allowed to complete until it is assured that the most recent data will be received upon access of the array.

It is a technical advantage of the invention to be able to have multiple accesses to the data array in each clock cycle.

It is another technical advantage of the invention to manage address conflicts and maintain program order without using a store buffer.

It is a further technical advantage of the invention to manage address conflicts and maintain program order with a cache that requires less complexity and less surface area of the CPU.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3 depicts the stages wherein access entries are issued from the queues;

FIGS. 4A and 4B depicts the portions of the issue algorithm for the L1 cache of FIG. 1;

FIG. 5 is a flow diagram depicting the pipeline operations of the L1 cache for a series of access requests;

FIGS. 6A and 6B depicts the cancellation logic that cancels access that follow other accesses.

DETAILED DESCRIPTION

Figure 1:
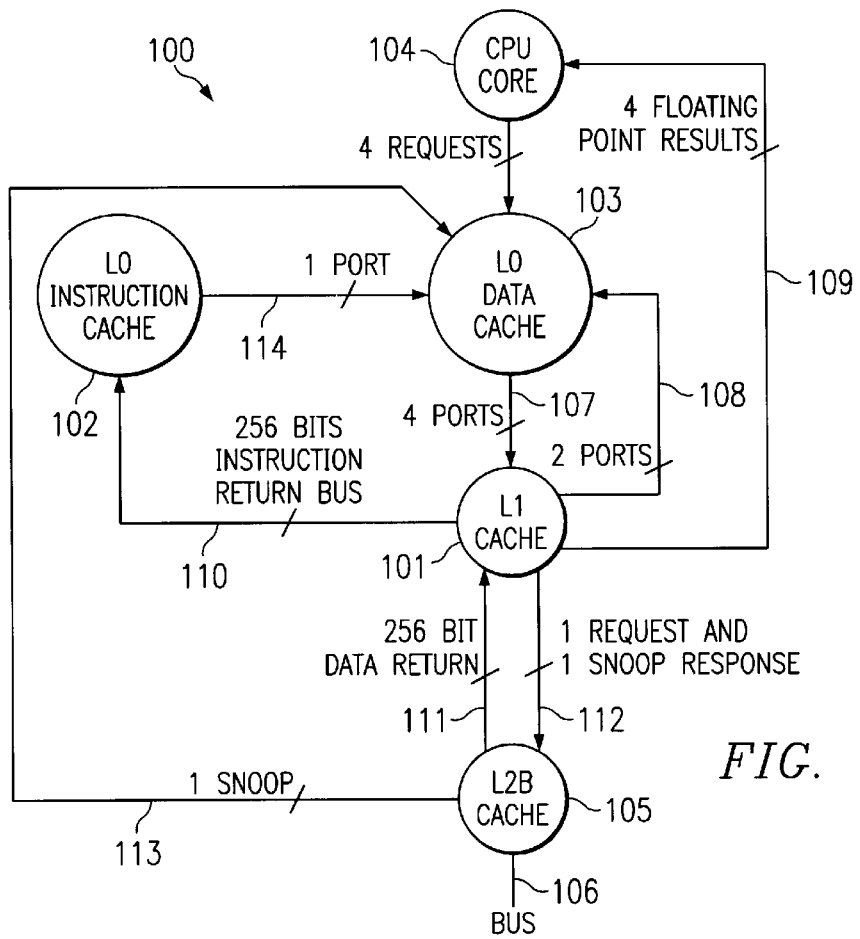
FIG. 1 is a block diagram depicting the inventive cache arrangement.

FIG. 1 is a block diagram depicting the arrangement 100 of the L1 cache 101 with the L0 instruction cache 102, L0 data cache 103, CPU 104, and the L2 cache 105 and the information pathways between the caches, CPU 104, and system bus 106.

The L1 cache 101, which is a combined data and instruction cache, receives access requests from the L0 data cache 103. Included in that L1 cache are queuing structures that hold the tags and the data for information stored in the cache. The L1 cache is configured to be able to receive, every clock cycle, 4 accesses or access requests from the L0 data cache, via 4 ports 107. The accesses may be stores or loads. A store is a memory access request desiring to write data to cache. A load is a memory access request desiring to read data from the cache. L1 cache uses a pipeline and two queues to manage the access requests. The accesses can be pulled from the pipeline or the queues for processing. The L1 cache may supply up to two integer results per clock, via two ports 108, to the L0 data (L0d) cache 103. These integer results may be sent by the L0d cache to the integer general registers in the CPU core 104. The L1 cache can also supply up to 4 floating point results per clock, via four ports 109, directly to the floating point registers of the CPU core 104. The L1 cache can also send 256 bits of instruction data to the L0i cache via return bus 110. The interfaces permit the L1 cache to communicate with the other caches, CPU, and other elements coupled to the bus 106. Bus 113 provides multi-processor support, by allowing snoop requests from other processors to access the L0 cache. Note that a snoop request will be passed onto L1 cache as if the snoop was a CPU request.

Path 114, between L0 instruction cache and L0 data cache, is for instruction fetch requests that have missed the L0 instruction cache. The L0i cache makes a request of the L0 data cache for a line of memory containing instructions to execute. The L0 data cache utilizes an unused one of the 4 ports 107 to send the instruction request to the L1 cache 101.

Path 112 is actually 2 paths. The request part of path 112 is used for sending data or instruction accesses to the L2 cache 105. These requests may be speculatively sent, i.e. before knowledge of an access miss of the L1 cache in order to minimize the latency of accessing the L2 cache. The L2 provides a full line of data in 4 clocks over the data return bus 111 to the L1 cache 101. The L1 cache fills the full line of data into the L1 cache and can bypass the result to the necessary consumer which could be any of 102, 103, or 104. The other path of path 112 is the snoop response path. For a snoop of the L1 cache, the L1 provides a report to the L2/Bus Cluster regarding the status of the line in the L1 cache. This result is provided utilizing the snoop response path part of path 112.

Note that instruction return bus 110, new access ports 107, integer return ports 108, and fp return ports 109, L2 request port 112, and data return bus 111 can all be active at the same time with some restrictions. The biggest restriction is on the fp return ports 109, integer return ports 108, and instruction return ports 110. There are several possible maximal combinations of activity that can be supported. The limitations are based upon the 4 access per clock limitation for data accesses, and the array limitations of only being able to supply 512 bits per clock, and the oversubscribe logic which can alleviate resource conflict blockages to some extent. The possible simultaneous port usage from L1 return ports 109, 108, and 10, is as follows:

| FP Ports | Integer Ports | Instruction |
|---|---|---|
| 2 | 2 | yes |
| 4 | 0 | yes |
| 4 | 2 | no |

Note that the two integer ports with the four fp ports are really using the integer ports to send a line of data to the L0d cache.

The arrangement 100 would operates as follows. For example, the CPU 104 issues an integer load type instruction, which is sent to the L0 data cache and to the L1 cache in parallel. The tags of each cache are accessed in parallel. Note that the tags of the L1 cache are being accessed speculatively, in other words assuming that the L0 data cache does not have the data and will miss. If the L0 data cache does miss, then the L1 will use the results of that speculative tag access to determine if it has the data or not. If the L0 data cache does have the requested data, then the L0 will return the data to the CPU core register file, and the L1 will halt accessing, even though it has speculatively accessed the tags and may have also speculatively accessed the data. The L0 data cache sends a signal to the L1 cache to inform the L1 cache of a hit or miss. If the L0 data cache has a miss, and the Li cache has a hit, then the integer data is returned to the L0 data cache 103, via ports 108. The data could be used in moving a line of data up to the L0 data cache, or sent to, via the L0 data cache, to the CPU core integer register file, or both.

After the L1 cache receives the speculative request from the L0 cache, the L1 cache sends a speculative request to the L2 cache. If the L1 cache misses, then the L1 cache allocates a line in its array, in anticipation of a data return from L2 cache. Note that bus 112, which carries the speculative request to the L2 cache is a single port bus, capable of carrying one request per clock cycle, so priority select structures are used to connect the appropriate L2 cache structures to the bus. If the L2 cache has the data, and assuming that the L0 cache and the L1 cache do not, then the L2 cache will send that data back to the L1 cache. The L1 cache will fill that data into the L1 cache. First, it buffers up an entire line, including the requested data, and then it writes the line into the L1 cache array. In parallel with the buffering, the cache also sends the requested data to the L0 data cache, and/or the CPU core. If the L2 misses, the L2 uses its BRQ structure, or Bus Request Queue, to send a request onto the processor interface memory bus 106 or system bus. This request will retrieve a line from RAM memory. Note that the L2 cache may be larger than the L1 cache, and the L1 cache may be larger then the combination of L0 instruction cache and L0 data cache. Also note that the L0 cache is split so that the relevant portions are located closer to the processor consumer components that use the respective cache portions, thereby reducing latency. Further note that L0, L1 and L2 may all be located on the processor chip to reduce latency.

Figure 2A:
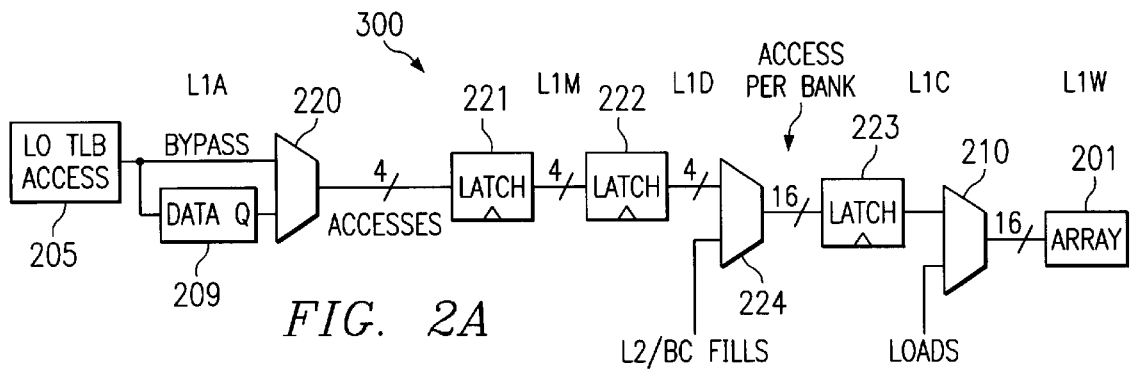
FIGS. 2A and 2B depict the internal elements of the L1 cache of FIG. 1 used in a store operation.

FIG. 2A depicts the address information path for a store operation. This flow arrangement 300 begins with the tag access and ends with storing the data to the memory array of the L1 cache 201. An access, including the physical address, is sent from the L0 data cache to the L1 cache, wherein the tags are accessed 205 to determine if there is a hit. If there is a hit, the access is sent to either the instruction queue 206 or the data queue 209.

Priority logic (not shown) controls the MUX 220, and thereby chooses one of the data queue 209 or the bypass as the source of the address information. The address information comprises an address or index, way, and read/write (load/store) information. Note that up to four access can be handled in the same cycle. The latches 221, 222, 223 are used for timing purposes in moving the data along the pipeline. MUX 224 permits addresses for fills to be brought in from port 111. The selected address is used as the address for the store into the array 201.

The MUX 210 is used for selecting the following: data Q accesses; instruction accesses; bypass accesses (from 107/205); store accesses (from 223 and 224); and fill accesses (from 223 and 224). Note that the loads and stores originates at port 107.

Note that there is a window between the stores and loads. Because some stores also do loads, stores cannot write their data to the memory array until they have been combined with load data and have had new ECC generated. Thus, the stores cannot occur until 3 pipe stages after the earliest time a load could be done. Loads are allowed to issue before stores, since this would penalize loads and force them to wait until a store would be done. (Note that this would also complicate small stores, which are stores that need to be combined with load data and have ECC generated.) Thus, loads are allowed to access the data arrays as soon as they possibly can, and stores are made to update the array as soon as the slowest store possibly can. The slowest store is a small store that must be combined with a load before generating ECC. Therefore, there are 3 clocks between the pipeline stage of a load and that of a store impacting the array. This is why there are the extra pipeline latches 221, 222, 223 shown in FIG. 2A.

Figure 2B:
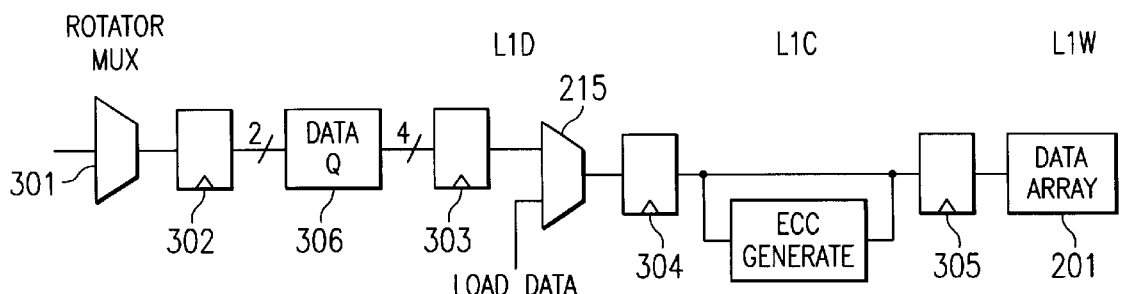

FIG. 2B depicts the flow of data in a store operation. This flow begins with rotator MUX 301, which puts the register file data into memory format. The latches 302, 303, 304, 305 are used to maintain timing in the pipeline. After rotation, the data is placed into data queue 306, which is different from data queue 209. Data queue 209 holds an address, while data queue 306 hold the data to be associated with the address. Note that a maximum of 2 stores per cycle are received, but a total of 4 accesses total per cycle may be received. Thus, the MUX/latch/queue 301, 302, and 306 are designed to only accept 2 accesses per clock, the specific 2 stores possible per clock. MUX 215 allows for data loaded for a read/modify/write operation from P0–P3 to be stored. ECC is generated for the data, which is then stored into the array 201 along with the data.

FIG. 3 depicts the flow of information for data inserts into the queues of the L1 cache 101. The upper pipeline 402 is the main CPU pipeline and comprises the EXE (execution), DET (exception detection), and WB (write-back) stages. The physical address 404 of the access request is received in the L0M stage. The store data 405 is sent by CPU in the EXE stage. The inserts occur in stage L0W. The L1 cache uses five queues.

The first queue is the data queue 306, which holds the actual data used in the store operation. The data is inserted into the queue in stage L0W 403. This data will be read out later for the store into the L1 array. The next queue is the fill buffer 505. This queue is used to hold information about requests made to the L2 cache or bus cluster. Such requests are processed when there is a miss for the L1 cache. The information in the queue is used in processing data returns from the L2 cache or bus cluster, and for managing address conflicts. The third queue is data queue 209, which holds the address and other information, such as control and ordering information, that is associated with the write data that is being stored into queue 306. Control information includes whether the access is a L1 cache hit, a L1 cache miss, or a re-circulate. Other information includes memory type, whether the access is a write-back, write-through, or uncacheable, also whether or not to fill the L0 cache, and if so information regarding the fill associated with this access. Further information details whether the access has been successfully retired from the CPU pipeline, which applies if the access does not have any faults or trapping indications that would prevent it from updating memory or returning data to a target register (for a load). The queue can hold 32 entries. This information is used in accessing the L1 cache, issuing data to the L2 cache, and ordering and address conflict management. The next queue is the instruction queue 206. Instructions, when they arrive in the L1 cache are routed to the instruction queue. The instruction queue is managed with a different algorithm than the data queue 209, because the ordering requirements for instruction accesses are different than for data accesses.

The arrangement of FIG. 3 operates as follows. The store data enters through rotator 301 in DET stage. The store data is then stored 403 into data queue 306, via latch 302, in the WRB stage of CPU pipeline 402. These steps format the store data into memory format and insert the data into the data queue 306. The physical address 404 from the TLB and the other access information 406 is received in the L0M stage. The other access information comprises op code, data size, and miscellaneous information from the TLB such as memory attribute type. CAM checks 407, 408, or content addressable memory, is performed on the Fill Buffer 505 and the Data Queue 209 to determine whether there are any conflicts with other pending access requests in the next stage, namely L0D. A cam check compares the address of the access request with the addresses of the access entries in the queues.

If there are misses on both the fill buffer and the data queue cams, then there are no conflicts with queue entries and the queues are filled as needed.

If there is a hit on the fill buffer cam, then a prior request missed in L1 cache, and a request entry is pending for the data from either L2 cache or the bus cluster. Note that a hit on the fill buffer cam does not necessarily mean that there will be hit in the data queue 209 cam as well. The access request that matched is inserted as a re-circulate entry into either the data queue or the instruction queue, as appropriate. The re-circulated entry will not access the cache until the prior miss is returned.

If there is a hit on the data queue cam, then its disposition depends on the L1 tag match information of both the access and the entry. If both the access and the conflicting entry have L1 hits, then the access is inserted into the data queue as a L1 hit entry. If the access has an L1 miss and the entry has an L1 hit, then the access is inserted into the data queue as a L1 miss entry. An illegal state is where the access has an L1 hit and the entry has an L1 miss, as this combination cannot occur. If both the access and the entry are L1 misses, then the access is inserted into the data queue as a re-circulate entry.

Hits in the L1 cache are managed according to their access type, e.g. load or store, and access size. If one (or both) of the matching accesses, old or new, is a store, then conflict information regarding the matching addresses is stored in the queue along with the newer access. The conflict information invokes a special architectural ordering mechanism called Effective Release. The issue algorithm uses this mechanism to ensure that the newer access is not issued before the older access. Specifically, when one of the accesses is a store, then the accesses are issued in order. If both of the matching accesses are loads, then they can be issued in any order.

Size of the different conflicting accesses is taken into account. For example, one request is a load request (read operation) that is promoting a cache line from the L1 cache into the L0 data cache, i.e. a fill for the L0 data cache, and a second request is a store operation that is stored data into a portion of the cache line of the load access. Size works to enable or disable particular address bits in the CAM, which will be detected by the CAM checks. Size can be viewed as a mask on the CAM function.

There are three states for an access in both the data queue 209 and the instruction queue 206, specifically, L1 hit, L1 miss and re-circulate. The fill buffer has one state, namely L1 miss. Re-circulation is a stalling mechanism that routes the one of the four accesses back to the L0M stage, wherein the tags are re-accessed. Re-circulation allows for accesses to be stalled, for example, if an access has a conflict with a previous miss, which is waiting for data to return from L2 cache or the bus cluster, then the newer access can be re-circulated until the data arrives. Re-circulation is unlimited in terms of the number of times that an access may be re-circulated. Note that hit and miss here mean hit and miss as determined by the L1 tag access check, not the fill buffer and data queue cam checks. The L1 tag access check is performed in parallel with the L0 TLB access. A "miss" is sent to the L2 cache or the bus cluster, while a "hit" indicates that the data is in the L1 cache, and can be retrieved from the L1 cache.

When attempting to insert an access into the data queue 401, in addition to the ordering and address information, bank conflict information 409 is also determined in order to optimize the issuing algorithm. This information is related to the design of the cache memory array. Ideally, in processing multiple accesses simultaneously, each access would be accessing different memory banks, as two accesses involving the same bank cannot be processed in the same cycle (note that one or more banks may be involving in an access). Thus, accesses involving the same memory bank(s) are assigned different issuing cycles to improve performance. Any bank conflicts are stored along with the access into the data queue 209. Note that inserts of instructions 206 are not checked, as only one instruction can be stored or loaded in one cycle, whereas multiple data accesses (four) can be performed in a single cycle, so there are no ordering conflicts with instructions. However, instructions will have address conflict checks similar to those performed for data, e.g. cam 408, so that only one miss is tracked at a time for a given line address.

As shown in FIGS. 2A and 2B, the data queue 306 can issue 4 accesses per clock down the pipeline, with FIG. 2A depicting the address path and FIG. 2B depicting the data path. However, multiple accesses (loads or stores) cannot access the same bank of memory at the same time. The cache memory array 201 is organized into 16 banks. Each bank has separate access logic or circuitry. Thus, the logic can only satisfy one access at a time (per clock). The bank identification for an access is part of the memory address, e.g. bits 7 through 4 of the access address. Thus, if two store access were sent down the pipeline, with the first accessing banks 1–3 and the second accessing banks 3–5, then since the accesses overlap, i.e. bank 3, then both of the accesses can not be completed.

Prior to inserting the accesses into the queues, i.e. the data queue 209, the cache performs a cam check to determine bank conflicts, 409. This cam check compares the bank numbers of each new access with the accesses stored in the queue. Since multiple accesses can be inserted in one clock cycle, the cam check also compares the bank numbers of each new access with the other new accesses in the same clock cycle. Each old access that has a conflict is tagged with conflict information indicating that it has a bank conflict and include information identifying the conflicting younger accesses.

Figure 4A:
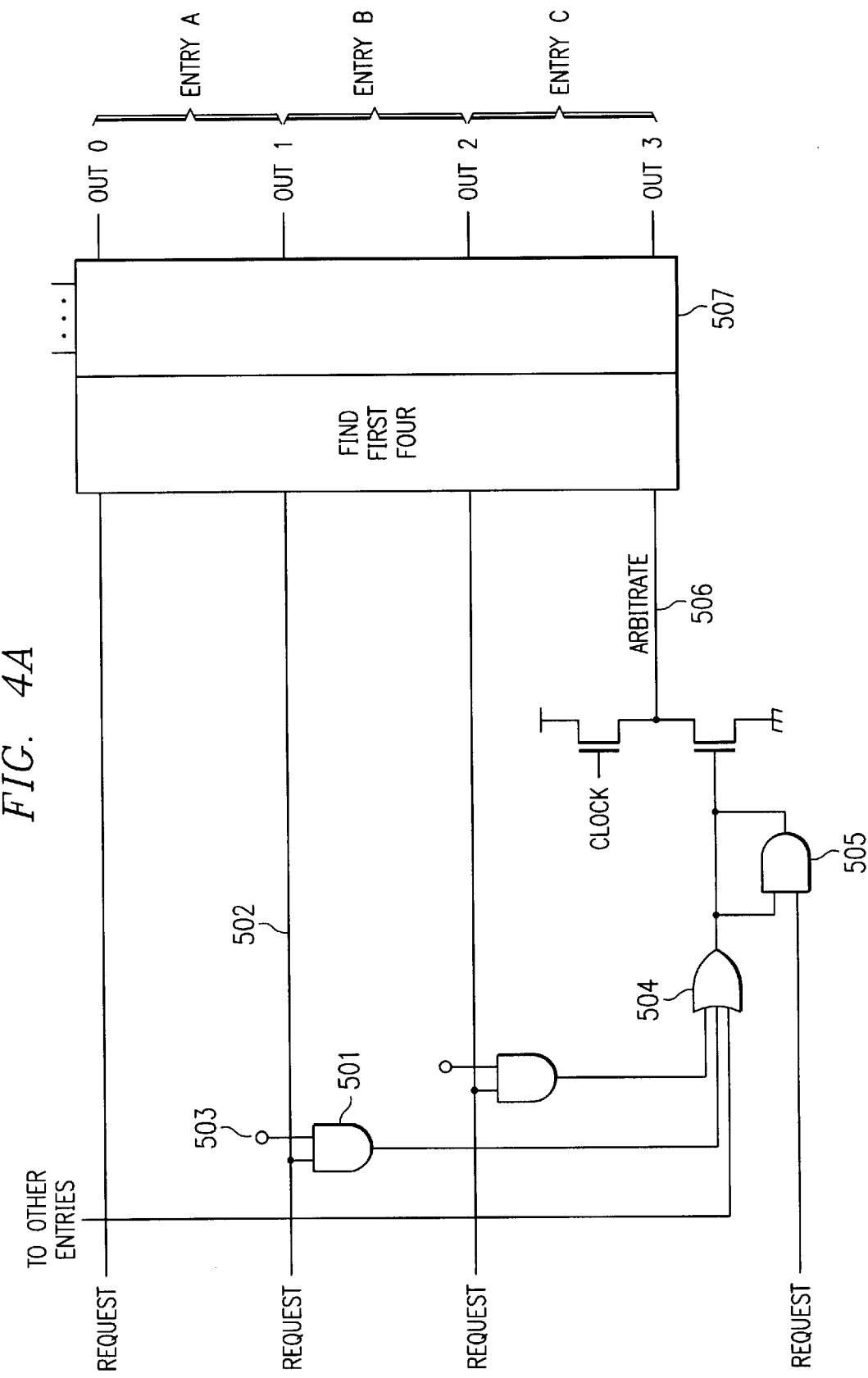
Figure 7:
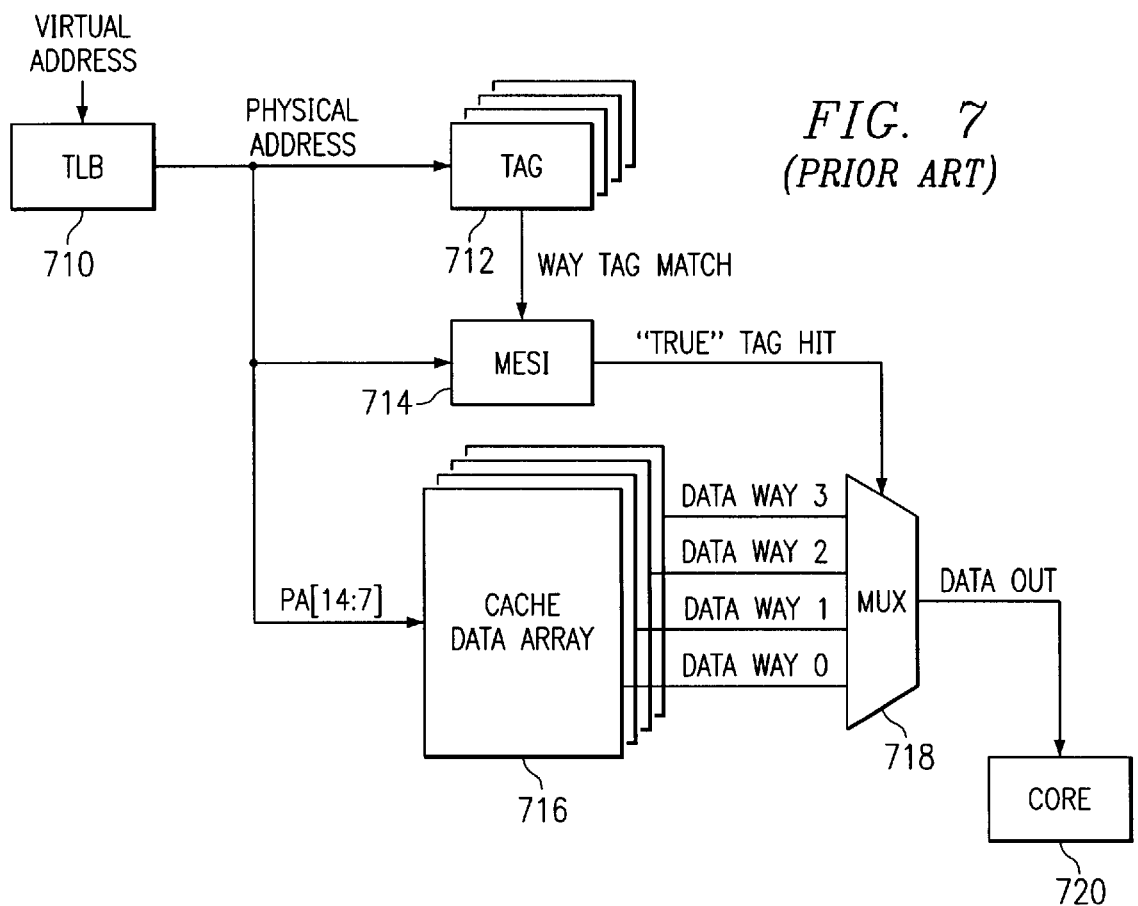
FIG. 7 depicts a prior art arrangement for a cache structure.

FIG. 4A depicts the portion of the issue algorithm that manages cache memory bank conflicts, specifically the portion of logic for entry C of the data queue. This logic is replicated for each entry in the queue. Thus, if the queue has 32 entries, then this logic is replicated 32 times. Note that each entry can only be tagged with a conflict for the next younger 15 neighboring entries, however more bits can be added to cover the remaining entries. In FIG. 4A, three access entries are shown, A, B, C, with A being older than B, and B being older than C. Suppose, entry A has a conflict with entry C, then entry A is tagged with a bit 503 indicated a conflict with entry C Note that C is not tagged, this issue mechanism operates because entries are issued in program order. Each entry has an AND gate 501 that is connected to a request line 502 and the conflict bit line 503. The request line indicates that a particular entry is attempting (or has been nominated) to issue. Suppose entry A and entry C are attempting to issue. Thus, AND gate 501 with both inputs high will go high, and provide the high input to OR gate 504. With one of its inputs high, OR gate 504 goes high. Since both of the inputs to AND gate 505 are high, then AND gate 505 will cause arbitrate signal 506 to go low on the next cycle. The arbitrate signal indicates that the find-first-four-logic 507 should decide which entry A or C should issue. Note that each of the 32 entries has an arbitrate signal, which must be high if an access is to issue. Each entry's arbitrate signal is ANDed with the requesting signal, and the output is fed into the find first four logic. If an arbitrate signal is deasserted for an entry, then the input to the find first four logic for that entry indicates the entry cannot issue in that clock. Other entries that can issue are considered, and will be allowed to issue.

The logic 507 determines which is older, and allows that entry to issue. Since C cannot issue, the logic 507 determines three other accesses that can issue, and allows A and the three others to issue. Thus, this logic prevents a bank conflict by preventing two (or more) accesses from issuing that will access the same cache memory bank. Note that the logic determines which is the oldest because the entries are filled in a deterministic manner in a queue, i.e. oldest first then youngest. Note that this logic operates in a single clock cycle. This logic resides in data queue 209 and operates in stages L1N and L1I, even though it operates in a single cycle that is split between two clock cycles. Note that the arbitrate logic resides in L1N, however, the first four logic operates at the beginning of L1I. Further note that this logic has prevented the access entry C from issuing. This entry could be considered for issue again in the next clock cycle.

As shown in FIG. 3, prior to inserting the accesses into the queues, i.e. the data queue 209, the cache performs a cam check to determine address conflicts, 408. This cam check compares the addresses of each new access with the accesses stored in the queue. Since multiple accesses can be inserted in one clock cycle, the cam check also compares the addresses of each new access with the other new accesses in the same clock cycle. Each new access that has a conflict is tagged with conflict information indicating that it has a conflict and include information identifying the conflicting older access(es). Note this is different than bank conflicts. This tagging is done with the "effective release" notation. Further note that a bank conflict is two accesses that require the same memory bank in to complete. An address conflict is two accesses where the younger must complete after the older in order. If the accesses do not complete in order, then either memory or a CPU register will be updated with the wrong information.

FIG. 4B depicts the portion of the issue algorithm that manages cache memory address conflicts, specifically the portion of logic for entry C of the data queue. This logic is replicated for each entry in the queue. Thus, if the queue has 32 entries, then this logic is replicated 32 times. In FIG. 4B, three access entries are shown, A, B, C, with A being older than B, B being older than C. Suppose, A, B, and C are attempting to issue, with B and C attempting to address the same location, and A and B having a bank conflict. For the address conflict, the effective release bit 513 is set on the younger access, here entry C. This bit causes the entry to be treated like a release operation. The release operation defines the entry as not being able to complete until older accesses have been completed. Note that completion means processed to a point where the access cannot be prevented from completing. For the bank conflict, the logic of FIG. 4A would invoke the arbitrate signal for entry B. The inhibit signal 508 indicates that an entry has been prevented from issuing, and is based on the arbitrate signal. Thus, the inhibit signal would be active for entry B. With both inputs high, the AND gate 509 goes high. With one of its inputs high, the OR gate 510 goes high. The issue H bit or signal 512 indicates whether the particular access entry is associated is actually going to issue. Since all three inputs are now high, the AND gate 511 goes high indicating a bad release 514 for entry C. Note that the effective release 513 is not an architectural release, but rather is a hardware addition to the ordering model. This allows the issue algorithm to operate in an out of order manner, and yet still be able to guarantee that accesses will issue in order when ordering constraints need to be imposed. Note that this logic operates in a single clock cycle. This logic resides in data queue 209 and operates in stages L1. Note that access entry C has issued. The bad release bit 514 causes the access to be switched to invalid. The access continues to travel down the pipeline invalid, and is thrown away when the access reaches the array 201. Thus, less than four accesses will be processes with the array 201.

Another conflict problem is a store/load conflict. This conflict is best understood in terms of an example, which is depicted in FIG. 5. This FIGURE has the pipeline stages 515 across the FIGURE and time 516 down the FIGURE. FIG. 5 involves two stores and four loads being sequentially processed down the pipeline, in the order of Store1, LdA, LdB, LdC, LdD, and Store 2, one per clock cycle. All of these accesses overlap, and affect the same portion of cache memory. Also all of these accesses have issued. Note that only one entry per clock cycle has been shown for simplicity. The pipeline stages are shown in FIGS. 2A and 2B, with stages L1N and L1I being inside data queue 209. The specific accesses that cause address conflicts are a store followed by a load, a store followed by a store, or a load followed by a store. Note that a store followed by a store is a problem for two reasons. If they are done out of order, then memory reflects the value of the older store, not the younger after both complete. In addition, if the second store requires a read-modify-write operation (is a 1 byte or a 2 byte store for our processor), then the read part of the read-modify-write store must read the up to date value of memory. The conflict arises because loads and stores are processed at a different point in the pipeline, specifically loads are read in L1M, while stores are written in L1W. Thus, Store will not be processed until L1W, however loads LdA, LdB, and LdC will have passed the L1M stage before Store1 has been completed. Thus, unless LdA, LdB, and LdC are canceled, they will read incorrect data, i.e. old data. LdD will see the proper data as it reaches the L1M stage in clock 8, which is after Store1 has completed, and thus is allowed to complete. The loads LdA, LdB, and LdC will be re-circulated and allowed to complete after Store1 has completed. Note that Store2 will have to be canceled until LdA, LdB, and LdC have completed, otherwise the loads will be reading the data of Store2 not Store1. The logic in FIGS. 6A and 6B accomplishes these cancels.

Note that stores (writes) require more steps than loads (reads). For example, stores need ECC to be generated for the store data. Also stores may involve a read of other data and merge of the other data with the new data to form a cache line. These steps require additional time not needed for load operation. To prevent unnecessarily delaying all loads, load operations are allowed to access the data array in the pipeline earlier than store operations are ready to access the data array.

FIG. 6A depicts the cancellation logic 600 that cancels loads following a store operation. If there is a store operation in L1A, L1M, L1D, or L1C stage that matches the address (which comprises the index and way information) of a load operation in L1A stage, then the load in L1A is canceled. This prevents the loads LdA, LdB, and LdC from operating before Store1 has operated in FIG. 5. Note that since multiple accesses can issue in the same cycle, a store in L1A is compared to a load in L1A. Note that the index and way is a full address comparison. Further note that stores that attempt to issue together in the same clock are dealt by the bank conflict logic. The canceled accesses are switched to invalid. The accesses continue to travel down the pipeline invalid, and are thrown away when the accesses reaches the array 201.

An alternative embodiment to that of FIG. 6A is to not have the Store L1C comparison. In this case, since a load in L1A is only one clock cycle away from being permissible to process, this access could be delayed from issuing for one clock cycle, and then allowed to issue. Thus, circuitry similar to that of FIG. 4A could be used to inhibit the release of the load in L1A. The bits 503 would be set for an address conflict, specifically a bank conflict, that is three clocks away. Since the queue is not updated until the store is completed, then a comparison could be made between loads L1N stage and inflight stores in the L1M stage. Then all loads to the same bank as the store would be inhibited. Loads in the L1N stage are used, since this is the stage in which the arbitrate is checked. Thus LdC is inhibited (or delayed) and not canceled (or invalidated). Thus, LdC would be delayed one clock, and would become the same timing as LdD, so LdD and LdC might issue together, as long as they do not access the same bank.

FIG. 6B depicts the cancellation logic 601 that cancels stores following a canceled load or store operation. If there is a store operation in L1A stage that matches the address of any canceled access (load or store) in stages L1M, L1D, or L1C, then the L1A store is canceled. This prevents the Store2 in FIG. 5 from operating before loads LdA, LdB, and LdC have operated. Note that canceled prior stores will also cause a subsequent store to be canceled. Suppose in FIG. 5, the first store is canceled for a particular reason, if the second store is then written, the first store will pass back through and overwrite the second store. Thus the cache has incorrect data, as the data from the second store should be overwriting the first store. Consequently, the second store must be canceled, thereby allowing the first store to pass back through and write, and then the second store will pass back through and overwrite the first store.

Thus the inventive cache guarantees the processing of address conflict accesses in order, as well as bank conflicts.

Although the present invention and its advantages have been described in detail, it should be understood that various changes, substitutions and alterations can be made herein without departing from the spirit arid scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system comprising:
   a processor that executes instructions; and
   a multi-level cache structure accessible by said processor to satisfy memory access requests, wherein said multi-level cache structure is configured to receive multiple memory access requests and to process the multiple requests in parallel to determine whether one of said multiple levels is capable of satisfying the multiple received memory access requests;
   wherein one level of the multi-level cache structure comprises:
      a queue for holding entries of address information for data accesses;
      conflict logic for checking each access request with the entries of the queue for conflicts prior to insertion of each access request into the queue, for inserting an access with a conflict into the queue, and for inserting information describing the conflict into the queue; and
      issue logic for determining which entries to issue from the queue based on the results of the conflict logic.

2. The system of claim 1 wherein one level of the multi-level cache structure comprises a memory array for storing data that is arranged in a plurality of banks;
   wherein the conflict logic is bank conflict logic for checking each access request with the entries of the queue for bank conflicts prior to insertion of each access request into the queue, wherein a bank conflict arises when an access request is to the same memory bank as an entry, wherein the access inserted into the queue comprises an access with a bank conflict and wherein the information inserted into the queue comprises information describing the bank conflict; and
   wherein the issue logic issues the access and conflicting entry from the queue at different cycles based on the information describing the conflict.

3. The system of claim 2 wherein:
   the information describing the conflict is associated with the conflicting entry in the queue.

4. The system of claim 1 wherein:
   the conflict logic is address conflict logic for checking each access request with the entries of the queue for address conflicts prior to insertion of each access request into the queue, wherein an address conflict arises when an access request involves the same memory location as an entry, wherein the access inserted into the queue comprises an access with an address conflict, and wherein the information inserted into the queue comprises information describing the conflict; and
   the issue logic issues the access and conflicting entry from the queue at different cycles based on the information describing the conflict.

5. The system of claim 4 wherein:
   the information describing the conflict is associated with the access in the queue.

6. The system of claim 1 wherein the multi-level cache structure processes the accesses in a plurality of pipeline stages, the accesses comprise at least one load access and one store access, and the load access is operative on the multi-level cache structure in an earlier stage than the store access, and the multi-level cache structure further comprises:
   load conflict logic for checking for load conflicts between an earlier issued store access and a later issued load access, wherein a load conflict arises when the earlier issued store access and the later issued load access involve the same memory location, and the pipeline stage of the later issued load access is located proximate to the pipeline stage of the earlier issued store access such that the later load access would be operative on the multi-level cache structure prior to the earlier store access; and cancellation logic for canceling the later issued load access if the load conflict logic determines a load conflict for the load access.

7. The system of claim 6 wherein the load conflict logic comprises:

logic for determining whether a load access that has a load conflict is within one clock cycle of not having a load conflict; and delay logic for delaying a load access for one clock cycle that is within one clock cycle of not having a load conflict.

8. The system of claim 6 wherein the multi-level cache structure further comprises:

store conflict logic for checking for store conflicts between an earlier issued access and a later issued store access, wherein a store conflict arises when the earlier issued access and the later issued store access involve the same memory location, and the earlier issued access has been canceled such that the later store access would be operative on the multi-level cache structure prior to the earlier canceled access; and cancellation logic for canceling the later issued store access if the store conflict logic determines a store conflict.

9. A method of accessing a multi-level cache of a computer system, the method comprising:

receiving multiple memory access requests into a multi-level cache structure;

processing the multiple requests in parallel to determine whether one of said multiple levels is capable of satisfying the multiple received memory access requests, and if determined that at least one of the memory access requests can be satisfied by a level of the multi-level cache structure, then satisfying the one memory access request by the level of the multi-level cache structure;

holding address information for accesses in a queue;

checking each access request with the entries of the queue for conflicts prior to insertion of each access request into the queue;

inserting an access with a conflict into the queue;

inserting information describing the conflict into the queue; and determining which entries to issue from the queue based on the results of the conflict logic.

10. The method of claim 9 wherein one level of the multi-level cache structure includes a memory array for storing data that is arranged in a plurality of banks;

wherein the step of checking comprises checking each access request with the entries of the queue for bank conflicts prior to insertion of each access request into the queue, wherein a bank conflict arises when an access request is to the same memory bank as an entry;

wherein the step of inserting an access comprises inserting a bank conflict into the queue;

wherein the step of inserting information comprises inserting information describing the bank conflict into the queue; and wherein the method further comprises issuing the access and conflicting entry from the queue at different cycles based on the information describing the conflict.

11. The method of claim 10 wherein the step of inserting information comprises the step of:

associating the information describing the conflict with the conflicting entry in the queue.

12. The method of claim 9 wherein the step of checking comprises checking each access request with the entries of the queue for address conflicts prior to insertion of each access request into the queue, wherein an address conflict arises when an access request involves the same memory location as an entry;

wherein the step of inserting comprises inserting an access with an address conflict into the queue;

wherein the step of inserting information comprises inserting information describing the address conflict into the queue; and wherein the method further comprises issuing the access and conflicting entry from the queue at different cycles based on the information describing the conflict.

13. The method of claim 12 wherein the step of inserting information comprises the step of:

associating the information describing the conflict with the access in the queue.

14. The method of claim 9 wherein the multi-level cache structure processes the accesses in a plurality of pipeline stages, the accesses comprise at least one load access and one store access, and the load access is operative on the multi-level cache structure in an earlier stage than the store access, and the method further comprises the steps of:

checking for load conflicts between an earlier issued store access and a later issued load access, wherein a load conflict arises when the earlier issued store access and the later issued load access involve the same memory location, and the pipeline stage of the later issued load access is located proximate to the pipeline stage of the earlier issued store access such that the later load access would be operative on the multi-level cache structure prior to the earlier store access; and canceling the later issued load access if the step of checking for load conflicts determines a load conflict for the load access.

15. The method of claim 14 wherein the step of checking for load conflicts comprises the steps of:

determining whether a load access that has a load conflict is within one clock cycle of not having a load conflict; and delaying a load access for one clock cycle that is within one clock cycle of not having a load conflict.

16. The method of claim 14 further comprising the steps of:

checking for store conflicts between an earlier issued access and a later issued store access, wherein a store conflict arises when the earlier issued access and the later issued store access involve the same memory location, and the earlier issued access has been canceled such that the later store access would be operative on the multi-level cache structure prior to the earlier canceled access; and canceling the later issued store access if the store conflict logic determines a store conflict.

17. A computer system comprising:

a processor that executes instructions;

means for receiving multiple memory access requests into a multi-level cache structure;

means for processing the multiple requests in parallel to determine whether one of said multiple levels is capable of satisfying the multiple received memory access requests, and if determined that at least one of the memory access requests can be satisfied by a level of the multi-level cache structure, then satisfying the one memory access request by the level of the multi-level cache structure;

a queue for holding address information for accesses;

means for checking each access request with the entries of the queue for conflicts prior to insertion of each access request into the queue, said means for checking comprising
- means for inserting an access with a conflict into the queue;
- means for inserting information describing the conflict into the queue and associating the information describing the conflict with the access in the queue; and means for determining which entries to issue from the queue based on the results of the conflict logic.

18. The system of claim 17 wherein one level of the multi-level cache structure includes a memory array for storing data that is arranged in a plurality of banks;

wherein the means for checking comprises means for checking each access request with the entries of the queue for bank conflicts prior to insertion of each access request into the queue, wherein a bank conflict arises when an access request is to the same memory bank as an entry, wherein the access inserted into the queue comprises an access with a bank conflict, and wherein the information inserted into the queue and associated with the conflicting entry comprises information describing the bank conflict; and wherein the system further comprises means for issuing the access and conflicting entry from the queue at different cycles based on the information describing the conflict.

19. The system of claim 17 wherein the means for checking comprises means for checking each access request with the entries of the queue for address conflicts prior to insertion of each access request into the queue, wherein an address conflict arises when an access request involves the same memory location as an entry, wherein the access inserted into the queue comprises an access with an address conflict, and wherein the information inserted into the queue and associated with the access comprises information describing the address conflict; and wherein the system further comprises means for issuing the access and conflicting entry from the queue at different cycles based on the information describing the conflict.

20. The system of claim 19 wherein the multi-level cache structure processes the accesses in a plurality of pipeline stages, the accesses comprise at least one load access and one store access, and the load access is operative on the multi-level cache structure in an earlier stage than the store access, and the system further comprises:

means for checking for load conflicts between an earlier issued store access and a later issued load access, wherein a load conflict arises when the earlier issued store access and the later issued load access involve the same memory location, and the pipeline stage of the later issued load access is located proximate to the pipeline stage of the earlier issued store access such that the later load access would be operative on the multi-level cache structure prior to the earlier store access;

means for canceling the later issued load access if the step of checking for load conflicts determines a load conflict for the load access;

means for checking for store conflicts between an earlier issued access and a later issued store access, wherein a store conflict arises when the earlier issued access and the later issued store access involve the same memory location, and the earlier issued access has been canceled such that the later store access would be operative on the multi-level cache structure prior to the earlier canceled access; and means for canceling the later issued store access if the store conflict logic determines a store conflict.

21. The method of claim 10 wherein said one level of the multi-level cache structure including said memory array that is arranged in said plurality of banks is said level of the multi-cache structure determined to be able to satisfy said at least one of the memory access requests.

22. The system of claim 18 wherein said one level of the multi-level cache structure that includes said memory array that is arranged in said plurality of banks is said level of the multi-cache structure determined to be able to satisfy said at least one of the memory action requests.

* * * * *